(12) United States Patent
Paolucci et al.

(10) Patent No.: US 7,437,540 B2
(45) Date of Patent: Oct. 14, 2008

(54) COMPLEX DOMAIN FLOATING POINT VLIW DSP WITH DATA/PROGRAM BUS MULTIPLEXER AND MICROPROCESSOR INTERFACE

(75) Inventors: Pier S. Paolucci, Rome (IT); Benedetto Altieri, Milan (IT); Federico Aglietti, Rome (IT); Piergiovanni Bazzana, Rome (IT); Antonio Cerruto, Rome (IT); Maurizio Cosimi, Civita Vecchia (IT); Andrea Michelotti, Monterotondo (IT); Elena Pastorelli, Rome (IT); Andrea Ricciardi, Rome (IT)

(73) Assignee: Atmel Corporation, San Jose, CA (US)

( * ) Notice: Subject to any disclaimer, the term of this patent is extended or adjusted under 35 U.S.C. 154(b) by 211 days.

(21) Appl. No.: 10/986,528

(22) Filed: Nov. 10, 2004

(65) Prior Publication Data

US 2005/0216702 A1 Sep. 29, 2005

(30) Foreign Application Priority Data

Mar. 26, 2004 (IT) .......................... MI2004A0600

(51) Int. Cl.
*G06F 9/302* (2006.01)
(52) U.S. Cl. ......................................... 712/222; 712/35
(58) Field of Classification Search ....................... None
See application file for complete search history.

(56) References Cited

U.S. PATENT DOCUMENTS 4,996,661 A * 2/1991 Cox et al. .................... 708/508
5,053,987 A * 10/1991 Genusov et al. .............. 708/520
5,617,577 A 4/1997 Barker et al. ................... 712/12
5,734,921 A 3/1998 Dapp et al. .................... 712/10
5,826,100 A 10/1998 Bonet et al. .................... 712/33
5,884,089 A 3/1999 Orian et al. ..................... 712/1
5,960,209 A * 9/1999 Blount et al. .................. 712/1
6,023,757 A * 2/2000 Nishimoto et al. .......... 712/209

(Continued)

OTHER PUBLICATIONS

P.C. Tseng et al., "CDSP: An Application-Specific Digital Signal Processor for Third Generation Wireless Communications", IEEE, vol. 47, No. 3, Aug. 2001, pp. 672-677.

(Continued)

*Primary Examiner*—Kenneth S Kim
(74) *Attorney, Agent, or Firm*—Schwegman, Lundberg & Woessner, P.A.

(57) ABSTRACT

A system for digital signal processing, configured as a system on chip (SoC), combines a microprocessor core and digital signal processor (DSP) core with floating-point data processing capability. The DSP core can perform operations on floating-point data in a complex domain and is capable of producing real and imaginary arithmetic results simultaneously. This capability allows a single-cycle execution of, for example, FFT butterflies, complex domain simultaneous addition and subtraction, complex multiply accumulate (MULACC), and real domain dual multiply-accumulators (MACs). The SoC may be programmed entirely from a microprocessor programming interface, using calls from a DSP library to execute DSP functions. The cores may also be programmed separately. Capability for programming and simulating the entire SoC are provided by a separate programming environment. The SoC may have heterogeneous processing cores in which either processing core may act as master or slave, or both cores may operate simultaneously and independently.

11 Claims, 7 Drawing Sheets

U.S. PATENT DOCUMENTS

| | | | |
|---|---|---|---|
| 6,260,088 B1 | 7/2001 | Gove et al. | 710/100 |
| 6,317,770 B1 | 11/2001 | Lim et al. | 708/524 |
| 6,425,054 B1 | 7/2002 | Nguyen | 711/117 |
| 6,477,683 B1 | 11/2002 | Killian | |
| 6,675,187 B1 * | 1/2004 | Greenberger | 708/622 |
| 6,711,602 B1 * | 3/2004 | Bhandal et al. | 708/625 |
| 6,754,804 B1 * | 6/2004 | Hudepohl et al. | 712/34 |
| 2003/0009502 A1 * | 1/2003 | Katayanagi | 708/622 |
| 2004/0103218 A1 * | 5/2004 | Blumrich et al. | 709/249 |
| 2005/0097299 A1 * | 5/2005 | Dockser | 712/2 |

OTHER PUBLICATIONS

E. Salminen et al., "Interfacing Multiple Processors in a System-on-Chip Video Encoder", Circuits and Systems, 2001. ISCAS 2001. The 2001 IEEE Int'l Symposium on, vol. 4, May 6-9, 2001, pp. 478-481.

"International Preliminary Report on Patentability for International Application No. PCT/US05/07231, mailed Mar. 7, 2005", 17 pages.

\* cited by examiner

COMPLEX DOMAIN FLOATING POINT VLIW DSP WITH DATA/PROGRAM BUS MULTIPLEXER AND MICROPROCESSOR INTERFACE

CROSS-REFERENCE TO RELATED APPLICATION

This application claims priority from Italian Patent Application No. MI2004 A000600, filed Mar. 26, 2004.

TECHNICAL FIELD

The invention relates to multiprocessor systems and specifically to a system on chip for digital signal processing with complex domain floating-point computation capability.

BACKGROUND ART

The application of digital processing systems to problems of control and computation is rapidly expanding. Advances in the integration of systems on chip (SoC) have made possible a wide variety of new industrial and consumer products and capabilities. A prime example is a cellular telephone. These devices typically utilize a digital signal processor (DSP) to encode voice data, which has been acquired by means of an analog to digital converter, into a binary data stream suitable for transmission over a cellular network. The digital signal processor operates on data in a fixed-point representation. The DSP may be a separate integrated circuit, or it may be one component of an SoC, another typically being a microprocessor core providing additional control and features to the telephone.

It is possible to combine the microprocessor and DSP units in varying numbers: For example, in the journal publication entitled "Interfacing Multiple Processors in a System-on-Chip Video Encoder" by Erno Salminen et al., an SoC is described which implements a RISC processor core interfaced with two fixed-point DSP cores.

Although SoCs combining a microprocessor and one or more fixed-point DSP units are useful for a wide variety of applications, they suffer from a number of limitations:

First, the absence of floating-point capability in SoC DSPs limits algorithm development and adaptation for these systems. A variety of useful and well-known algorithms are more easily ported to the DSP using a floating-point number representation. One example is matrix inversion, a key ingredient for numerical analysis. This algorithm, and many others, can be ported in a more direct and simplified manner if the data are represented in floating-point format. The prior art fails to recognize this opportunity. For example, U.S. Pat. No. 6,260,088 B1 to Gove et al. discloses in column 16, lines 4-36 that an SoC combining a RISC processor and a DSP would preferably implement floating-point operations on the RISC processor, and restrict the DSP to fixed-point arithmetic, stating on lines 13-14 " . . . the low level processors do not require floating-point arithmetic . . . "

Second, although discrete floating-point DSPs are known in the art, all represent the data with limited precision, typically 32 bits. It is appreciated by those skilled in the art that the allocation of bits to the mantissa and exponent of a floating-point number sets limits to the precision and dynamic range of the data which can be represented. Many desirable applications can require processing of data which exceeds the precision and dynamic range capabilities of a typical 32-bit floating-point representation in which 24 bits are assigned to the mantissa and 8 bits to the exponent. This could, for example, include an analysis and reproduction of a 132 dB (22-bit) transient impulse embedded in a 96 dB (16-bit) signal. A situation of this type may be encountered in a symphonic attack after a crescendo, or in the simulation of a gunshot in a movie, simulation, or video game soundtrack. Diagnosis and analysis of data from noisy environments can also produce this type of situation.

Third, no floating-point DSP known in the art offers dedicated assembler instructions for single cycle computations on complex numbers. Complex-domain computations are frequently encountered in frequency domain algorithms, time-frequency domain analysis, and frequency-spatial wave-number algorithms. The well-known Fast Fourier Transform (FFT) is defined by means of complex algebra, and the capability of complex domain assembler instructions would enable a DSP to provide native support for the FFT, greatly facilitating applications to audio, radio, or ultrasound wave processing. The prior art has concentrated on computation of the FFT using integer number representations for complex numbers. For example, U.S. Pat. No. 6,317,770 to Lim et al. discloses in column 12, lines 50 through 55 that " . . . in the DSP according to the present invention . . . thereby performing the fixed-point and integer arithmetics in a high speed as well as simplifying the circuit configuration." It should be appreciated by those skilled in the art that floating-point complex arithmetic is an appropriate granularity for exploitation of instruction level parallelism at both the compiler and silicon levels, and for DSP application kernels.

Overcoming these foregoing limitations in a system with high processing speed would enable improvement or extension of SoC signal processing into applications such as:

1. Hands-free telephones incorporating multi-microphones, echo cancellation, and audio beam forming;
2. Ultrasound image scanners with better diagnostic image quality;
3. Adaptive sound equalization for home, auto, and cinema creating environment specific pre-equalization and pre-reverberation; and
4. Improved hearing aids and ear prostheses based on real time modeling of the cochlea.

What is needed is a complete signal processing platform which combines floating-point data representation, extended precision and complex domain arithmetic with adaptable control and system interfacing capability.

SUMMARY OF THE INVENTION

The challenges of providing signal processing capability optimized for specialized applications of the types discussed have been met in the present invention combining a microprocessor core and a very long instruction word (VLIW) digital signal processor (DSP) core having extended precision floating-point computation capability in the complex domain. An exemplary is configured as a system on chip (SoC) with heterogeneous processing cores in which either processing core may act as master or slave, or both cores may operate simultaneously and independently: The 1.6 Mbit program and data core memories of the DSP core are memory mapped on the controller's system bus. Direct memory access (DMA) and SoC system bus activities run in parallel with the cores on dedicated double port buffers.

In one embodiment, the DSP core operates on a 128-bit instruction word, using compressed program code loaded into a 8K by 128-bit single port memory. The DSP assembler automatically compresses program code by a mean factor of two to three, resulting in an average effective instruction density of 50-bits per stored cycle without loss of performance. Numerically intensive operations such as fast Fourier transforms (FFTs) and finite impulse responses (FIRs) can achieve code density of 4-bits per executed operation without loss of performance.

Components of the exemplary DSP core include a 17K by 40-bit dual port data memory, 256 pairs of 40-bit registers, and a highly parallel architecture with four multipliers, three adders, and three subtractors. During complex arithmetic operations, half the operators produce real results and half produce imaginary results simultaneously. Two 4-input, 4-output—by 256 location register files can be used to store 40-bit real and imaginary numbers separately, thereby enabling single-cycle complex arithmetic on extended precision floating-point data. Data from either register file may be input simultaneously to both sides of the operator block, as may any intermediate results of operations within each side of the operator block. This capability reduces a number of register file fetches and execution cycles by a factor of two during complex multiplications. Two sets of three 2k by 40-bit pages (12 KB total) internal dual port memory allows four simultaneous accesses (two reads and two writes). A multiple address generation unit (MAGU) with 16 address registers supports programmable stride on linear, circular, and bit-reversed addressing. The 40-bit data format provides an extended precision representation of the data in which 32 bits are employed for a mantissa and 8 bits are allocated to an exponent. The 32-bit mantissa may be conceptualized as a typical 24-bit representation with an additional 8 guard bits for preserving precision.

The exemplary DSP core is capable of producing real and imaginary arithmetic results simultaneously, allowing a single-cycle execution of FFT butterflies, complex domain simultaneous addition and subtraction, complex multiply accumulate (MULACC), and real domain dual multiply-accumulators (MACs). This multiplies by a factor of 2.5 the throughput per cycle when executing complex domain algorithms.

The control registers and memories of the exemplary DSP are mapped directly into the microprocessor core memory space, enabling the microprocessor core to read or write the DSP local data memories and configuration registers. There are two modes of operation, termed run mode and system mode. In system mode, the DSP processor halts and the internal resources of the DSP are mapped into the memory space of the microprocessor core. The microprocessor core controls the DSP's direct memory access (DMA) channel and can read and write the local data memories and configuration registers of the DSP. The microprocessor core can modify the content of the DSP program memory initiating a DMA transfer from the external memory or by directly writing four 32-bit words to four consecutive addresses at an appropriate program memory location. This complete visibility through the microprocessor core into the DSP resources allows code for both processors to be debugged using the microprocessor core debugging tools.

In run mode, the exemplary microprocessor core has access only to the DSP's command register and a 1K 40-bit dual port shared memory. Both processors operate under their own programs and either processor may operate as the master. The DSP core has a private external bus for optional external memory access, enabling the two processors to operate completely independently and simultaneously. The dual port shared memory of 1K extended precision locations is used for high bandwidth interprocessor communications between the microprocessor core and the DSP core. There are nine interrupts from the DSP core to the microprocessor core and three from the microprocessor core to the DSP core. The DSP core can drive 7 of 28 parallel input-output (PIO) lines and can receive interrupts from five PIO lines. The PIO lines are shared by both processor cores and are fully software configurable by the microprocessor core.

The DMA channel is intrusive between external memory and program memory and non-intrusive between external memory and data memory. Direct memory access with data memory involves the internal data buffer memory, a 20 KB dual port random access memory (RAM) connected on one port with external memory, with the other port connected to the DSP and register file and operators block. The DSP execution is not affected by data DMA. Program execution is stopped by DMA between external memory and program memory, because the DSP program memory is a single port RAM.

The exemplary DSP does not provide an interrupt service mechanism. Instead, a polling mechanism is used (with an instruction WATCHINT) to monitor status of an interrupt flag and branch appropriately. Interrupt latency is equal to the polling period+three clock cycles. Automatic insertion of the WATCHINT instruction may be provided by programming tools.

An exemplary method of interfacing the microprocessor and DSP cores facilitates a variety of programming models. The SoC may be programmed entirely from a microprocessor programming interface, using calls from the DSP library to execute DSP functions. The cores may also be programmed separately. Capability for programming and simulating the entire SoC are provided by separate programming environment means.

The capability of the SoC may be augmented by several peripherals, including two SPI serial ports, two USARTS, a timer counter, watchdog, parallel I/O port (PIO), peripheral data controller, eight ADC and eight DAC interfaces (ADDA), clock generator, and an interrupt controller.

DETAILED DESCRIPTION OF THE INVENTION

Figure 1:
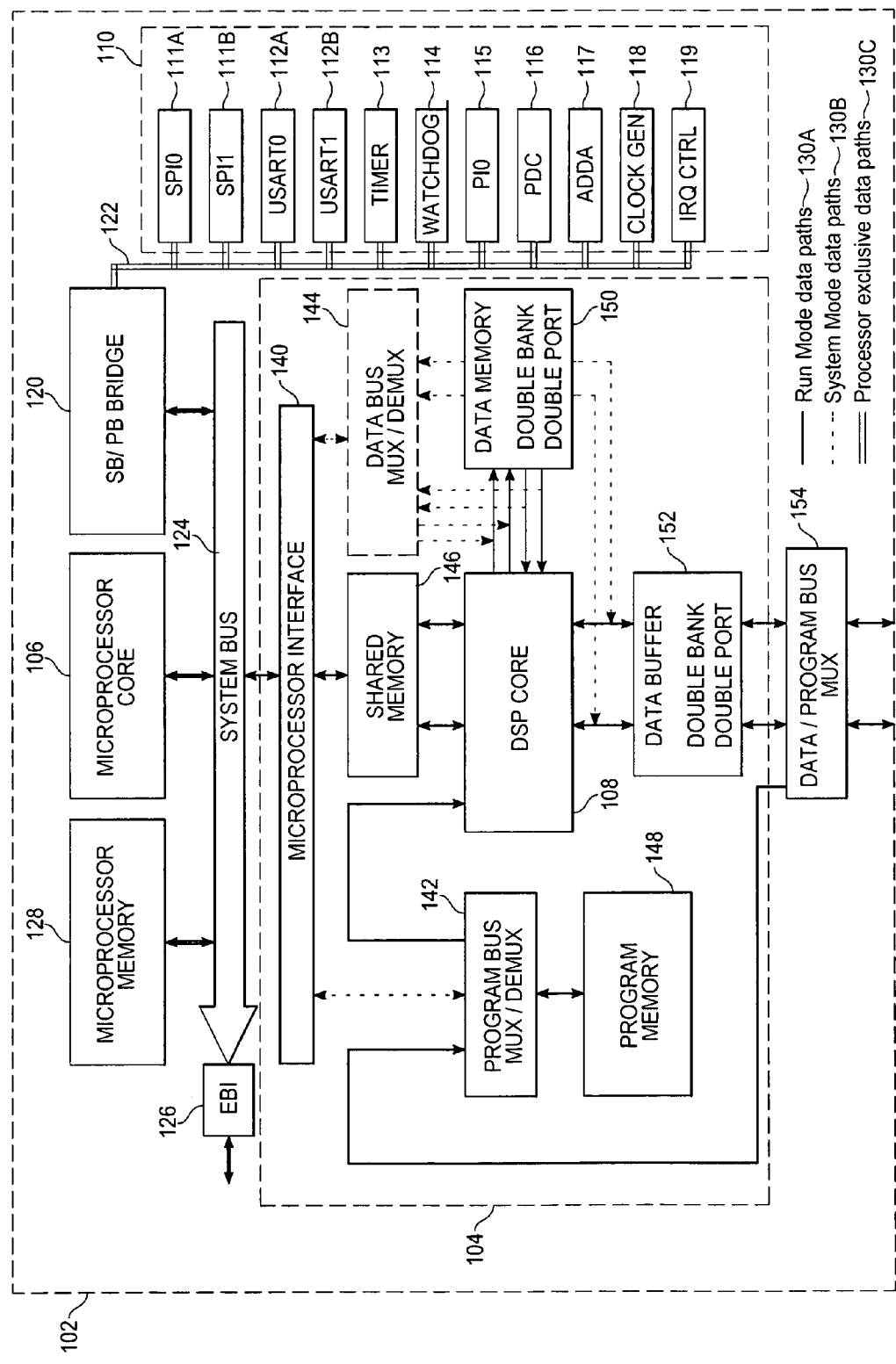
FIG. 1 shows an exemplary SoC organization of the processors, memory, peripheral blocks, and data bus structures for the present invention.

With reference to FIG. 1, an exemplary embodiment of the general architecture of a system on chip (SoC) 102 includes a floating-point digital signal processor (DSP) subsystem 104, a microprocessor core 106, and a peripheral circuits 110. In a specific embodiment, the microprocessor core 106 is an ARM7TDMI™ ARM Thumb processor core and the floating-point DSP subsystem 104 further comprises a digital signal processor (DSP) core 108 which is an Atmel® mAgic high performance very long instruction word (VLIW) DSP core. The peripheral circuits 110 communicate with a system bus/peripheral bus bridge 120 by means of a peripheral bus 122. The system bus/peripheral bus bridge 120 is coupled to a system bus 124. The system bus 124 is coupled to an external bus interface 126 which generates signals that control access to external memory or peripheral devices. A microprocessor memory 128 is coupled to the system bus 124.

The system on chip 102 of the exemplary embodiment has two modes of operation, termed run mode and system mode. These modes of operation will be explained in greater detail later, infra. Depending on the operating mode, different data paths may be operative. Run mode data paths 130A, are enabled when the system is in run mode. System mode data paths 130B, are enabled when the circuit is operating in system mode. Processor exclusive data paths 130C are enabled during either mode of operation. The run mode, system mode, and processor exclusive data paths, 130A, 130B, and 130C respectively, provide data path means for communication and data transfer between the elements of the SoC 102 as illustrated within FIG. 1.

The floating-point DSP subsystem 104 is comprised of the DSP core 108, a microprocessor interface 140, a program bus mux/demux 142, a data bus mux/demux 144, a shared memory 146, a program memory 148, a data memory 150, and a data buffer 152. The floating-point DSP subsystem 104 is coupled to the system bus 124, enabling two-way communication between the microprocessor core 106 and the DSP core 108. The data/program bus mux 154 multiplexes data accesses and program accesses of the floating-point DSP subsystem 104 to and from external memory. The data buffer 152 is a dual port double bank memory, with two ports coupled to the DSP core 108 and two ports coupled to the data/program bus mux 154.

In the exemplary embodiment of the present invention, the program memory 148 is a single port memory organized as 8K words by 128 bits, while the data memory 150 is organized as three memory pages, each 2K words by 40 bits, for a left data memory bank, and three memory pages, each 2K words by 40 bits, for a right data memory bank, giving 6K words of storage for each bank and 12K words of total storage. In the exemplary embodiment, the data buffer 152 is organized as 2K words by 40 bits for each of a left buffer memory and a right buffer memory, giving 4K words of total storage. Additionally, the shared memory 146 in the exemplary embodiment is a dual port memory organized as 512 words by 40 bits for each of a left shared memory bank and a right shared memory bank giving a total of 1K words by 40 bits. The organization and operation of the memory units will be detailed further, infra.

In the exemplary mode of operation, the microprocessor core 106 acts as a master controller of the SoC 102. The bootstrap sequence of the SoC 102 starts from the bootstrap of the microprocessor core 106 from an external non-volatile memory. The microprocessor core 106 then boots the DSP core 108 from the non-volatile memory. After bootstrap, the SoC 102 can initiate its normal operations. The DSP core 108 behaves as a slave device, allowing access to different system resources depending on the operating mode. In order to allow a tight coupling between the operations of the DSP core 108 and the microprocessor core 106 at run time, the DSP core and the microprocessor core can exchange synchronization signals based on interrupts.

System Mode Operation

In system mode, the DSP core 108 halts its execution and the microprocessor core 106 takes control of it. When the DSP core 108 is in system mode, the microprocessor core 106 can access a number of the internal devices within the DSP core. The ability of the microprocessor core 106 to access the DSP core 108 resources in system mode can be used for initialization and debugging purposes. By accessing command registers located in the digital signal processor (DSP) core 108 and the microprocessor interface 140, the microprocessor core 106 can change the operating status of the DSP core 108 between system mode and run mode, initiate DMA transactions, force single or multiple step execution, or read the operating status of the DSP core.

Run Mode Operation

In run mode, the DSP core 108 operates under control of its own VLIW program and the microprocessor core 106 has access only to the shared memory 146 and to command registers associated with the digital signal processor (DSP) core 108 and the microprocessor interface 140.

The peripheral circuits 110 may comprise a number of circuit blocks configured to perform conventional data and signal transfer operations generally known in the art. In the exemplary embodiment, the peripheral circuits 110 comprise serial peripheral interfaces (SPI) 111A and 111B, Universal synchronous/asynchronous receiver/transmitters (USART) 112A and 112B, a timer counter 113, a watchdog timer 114, a parallel I/O controller (PIO) 115, a peripheral data controller (PDC) 116, analog to digital and digital to analog interfaces (ADDA) 117, a clock generator 118, and an interrupt request controller 119.

Figure 2:
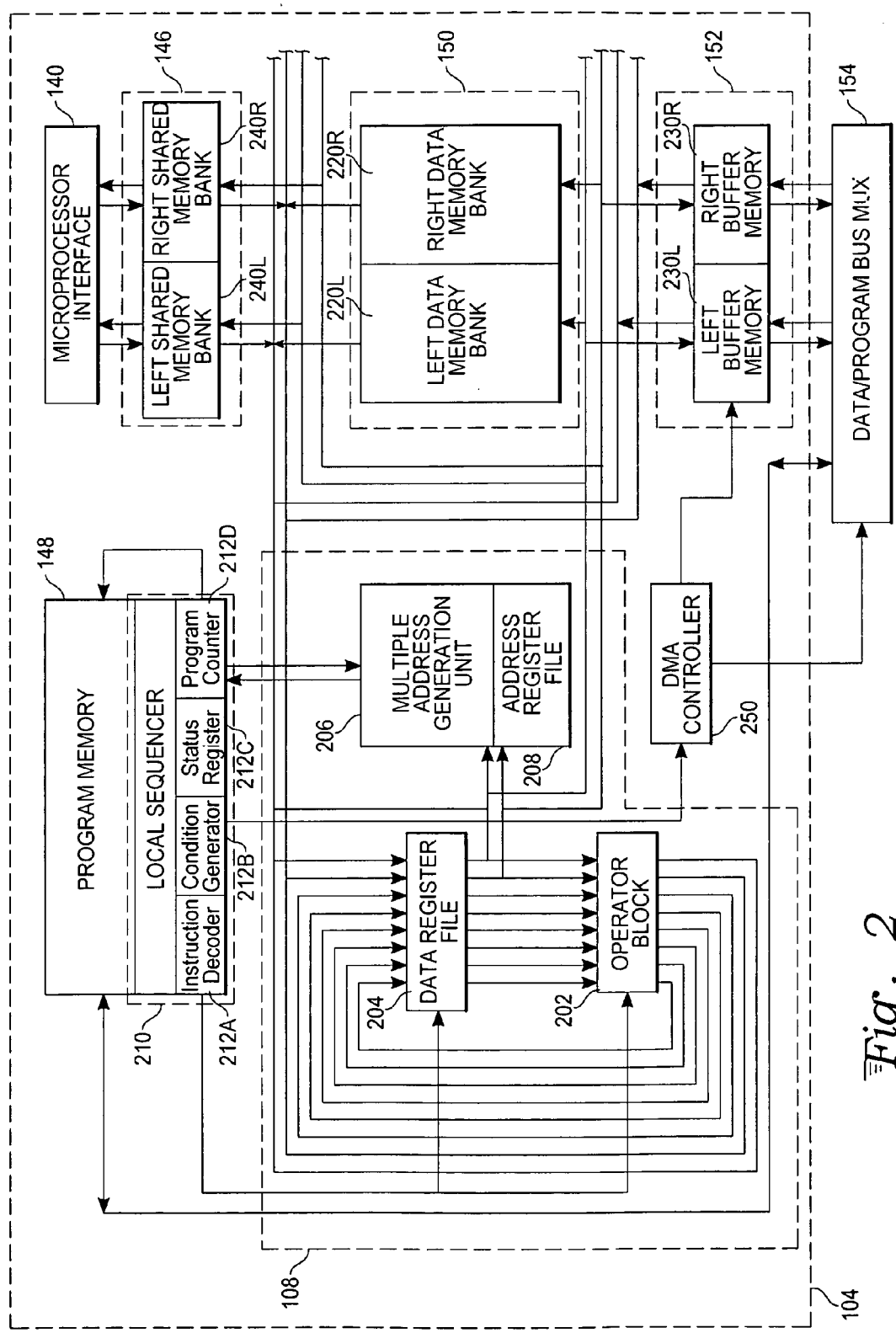
FIG. 2 is an exemplary block diagram of the DSP core architecture.

With reference to FIG. 2, further details of the construction and operation of the floating-point DSP subsystem 104 are now introduced. In the exemplary embodiment, the floating-point DSP subsystem 104 is a very long instruction word (VLIW) numeric processor, capable of operating on IEEE 754 40-bit extended precision floating-point data. The floating-point DSP subsystem 104 is also capable of operating on 32-bit integer numeric format data. The DSP core 108 is comprised of an operator block 202, a data register file 204, a multiple address generation unit 206, and an address register file 208. The operator block 202 contains the hardware that performs arithmetical operations. It is capable of operating upon either integer or floating-point data. Data path means are employed to operably interconnect all elements within the floating-point DSP subsystem 104 as well as to the data program bus mux 154 as illustrated in FIG. 2.

The program memory 148 stores the program to be executed by the floating-point DSP subsystem 104. The program memory 148 is coupled to a local sequencer 210 which performs tasks of local control and instruction decoding. The sequencer comprises an instruction decoder 212A, a condition generator 212B, a status register 212C, and a program counter 212D. In the exemplary embodiment the program memory 148 is configured as an 8K words by 128 bit single port memory. The portion of many applications requiring digital signal processing can be implemented using only the program memory. The program memory size of the exemplary embodiment is coupled with code compression to give an equivalent on-chip program memory size of about 24K instructions. When the system operates in system mode, the microprocessor core 106 can modify the content of the program memory 148 in two different ways: First, the microprocessor core 106 can directly write to a location in the program memory 148 by accessing the memory address space assigned to the program memory 148 in the microprocessor core 106 memory map. In this access mode, the microprocessor core 106 writes four 32-bit words to four consecutive addresses at correct address boundaries, in order to complete a single VLIW word write cycle. The microprocessor core 106 can also modify the content of the program memory 148 by initiating a DMA transfer from the external DSP memory to the program memory 148. In this access mode a single VLIW word is transferred from external memory to the program memory 148 at 64 bits per cycle, that is a complete word every two clock cycles. Due to the program compression scheme used, which allows an average program compression between two and three, the code accessing capability of the system from external memory is greater than an instruction per clock cycle. When the system is in run mode, the microprocessor core 106 cannot access the program memory 148. When operating in run mode the system can initiate a DMA transfer from external memory to the program memory 148 in order to load a new code segment. The data memory 150 is comprised of a left data memory bank 220L and a right data memory bank 220R. In the exemplary embodiment, the data memory 150 is organized as three memory pages in each memory bank; each page is 2K words by 40 bits for the left data memory bank 220L and 2K words by 40 bits for the right data memory bank 220R, giving a total of 6K words each for the left and for the right memory banks, for a total of 12K words storage. Each data memory bank 220L and 220R is a dual port memory that allows four simultaneous accesses, which in the exemplary embodiment are two of type read and two of type write. The DSP core 108 can access vectorial and single data stored in the data memory 150. Accessing complex data is equivalent to accessing vectorial data. During simultaneous read and write memory accesses, the multiple address generation unit 206 generates two independent read and write addresses common to both the left and the right data memory banks. The total available bandwidth between the data register file 204 and the data memory 150 is 20 bytes per clock cycle, allowing full speed implementation of numerically intensive algorithms (e.g., complex FFT and FIR). The data buffer 152 is comprised of a left buffer memory 230L and a right buffer memory 230R. In the exemplary embodiment, the data buffer 152 is organized as 2K words by 40 bits for both the left buffer memory 230L and the right buffer memory 230R. The data buffer 152 is configured as a dual port memory. One port of the data buffer 152 is connected to the DSP core 108. The multiple address generation unit 206 generates the buffer memory addresses for transferring data to and from the DSP core. The second port of the data buffer 152 is connected to the data/program bus mux 154. In the exemplary embodiment, the available bandwidth between the DSP core 108 and data buffer 152 is equal to the available bandwidth between the data/program bus mux 154 and the data buffer 152: 10 bytes per clock cycle. Also in the exemplary embodiment, the maximum external memory size of the system is 16 Mword left and right (equivalent to 32 Mword or 160 Mbytes; 24-bit address bus).

A direct memory address (DMA) controller 250 manages the data transfer between the external memory and the data buffer 152. The DMA controller 250 can generate accesses with stride for the external memory. Direct memory address transfers to and from the data buffer 152 can be executed in parallel with full speed core instructions execution with zero-overhead and without the intervention of the DSP core processor 108, except for transaction initiation. The last memory block in the address space of the DSP core 108 is assigned to the shared memory 146, and is shared between the DSP core 108 and the microprocessor core 106. The shared memory 146 is comprised of a left shared memory bank 240L and a right shared memory bank 240R. In the exemplary embodiment, the shared memory 146 is organized as a dual port memory 512 words by 40 bits for both the left shared memory bank 240L and the right shared memory bank 240R, giving a total memory of 1K by 40 bits. This memory can be used to efficiently transfer data between the two processors. In the exemplary embodiment, the available bandwidth between DSP core 108 and shared memory 146 is 10 bytes per clock cycle. Available bandwidth to the microprocessor core 106 is limited by the bus size of the microprocessor. In the exemplary embodiment, the processor bus size is 32 bits, giving a bandwidth of 4 bytes per microprocessor clock cycle.

Figure 3:
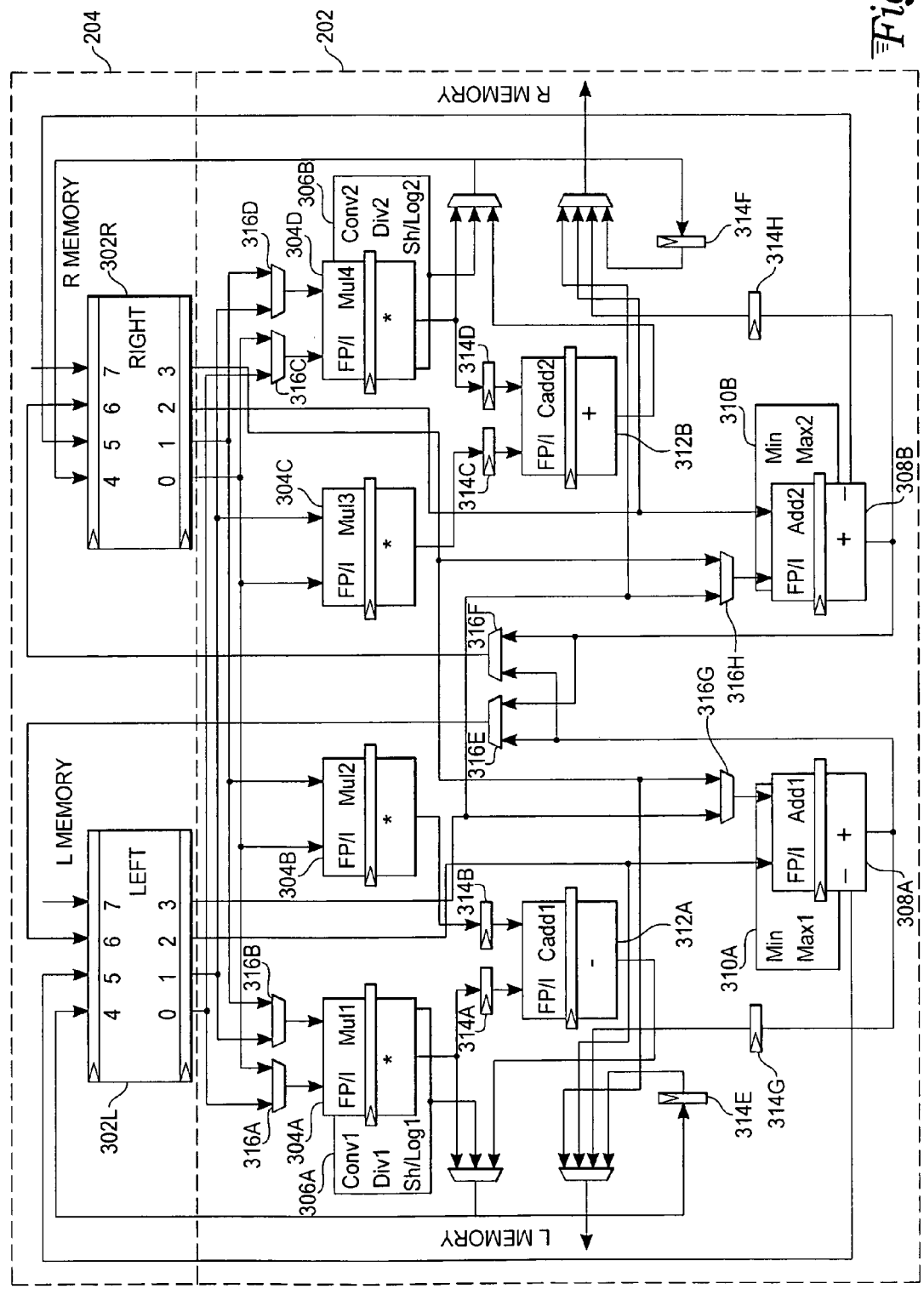
FIG. 3 is a block diagram of the processing unit for floating-point complex arithmetic.

With reference to FIG. 3, further details of the operator block 202 and the data register file 204 are presented for the exemplary embodiment of the present invention. The data register file 204 is coupled to the operator block 202. The data register file 204 is comprised of a left data register side 302L and a right data register side 302R. The data register file 204 is organized as a 256 entry complex register file comprising a real portion and an imaginary portion. The left data register side 302L and the right data register side 302R entries can also be used as a dual register file for vector operations. When performing single instructions the data register file 204 can be used as an ordinary 512 entry register file. Both the left data register side 302L and the right data register side 302R are 8-ported, making a total of 16 I/O ports available for data movement to and from the operator block 202 and the data memory 150, data buffer 152, and shared memory 146. In the exemplary embodiment, the total data bandwidth between the data register file 204 and the operator block 202 is 70 bytes per clock cycle, avoiding bottlenecks in the data flow.

Attention is now directed to details of the operator block 202, in the exemplary embodiment comprised of floating-point/integer multipliers 304A-D, convolution, division, and shift/logic units 306A and 306B, floating-point/integer add/subtract units 308A and 308B, min/max operator units 310A and 310B, floating-point/integer subtract unit 312A and floating-point/integer add unit 312B, registers 314A-H, two-input multiplexers 316A-H, three-input multiplexers 318A and 318B, and four-input multiplexers 320A and 320B. The division function within the convolution, division, shift/logic units 306A and 306B perform seed generation for efficient division and inverse square root computation. Data path means couple the elements of operator block 202 together in accordance with the routing illustrated in FIG. 3. The arrangement of elements of the operator block 202 enables the operator block to natively support complex arithmetic in the forms of: single cycle complex multiply or single cycle complex multiply-and-add, fast FFT computation as in a single cycle butterfly computation, and vectorial computations. The peak performance is achieved during single cycle FFT butterfly execution, when DSP core 108 delivers 10 floating-point operations per clock cycle.

In the exemplary embodiment, the floating-point DSP subsystem 104 is a VLIW engine, but from the user's perspective may by considered to operate like a RISC machine by implementing triadic, dyadic, or 4-adic computing operations on data coming from the data register file 204, and data move operations between the local memories and the data register file 204. Operators are pipelined for maximum performance. A pipeline depth depends on the operator employed. The operations scheduling and parallelism are automatically defined and managed at compile time by an assembler-optimizer, allowing efficient code execution. The configuration of the data register file 204 as presented provides support for a RISC-like programming model.

Figure 4:
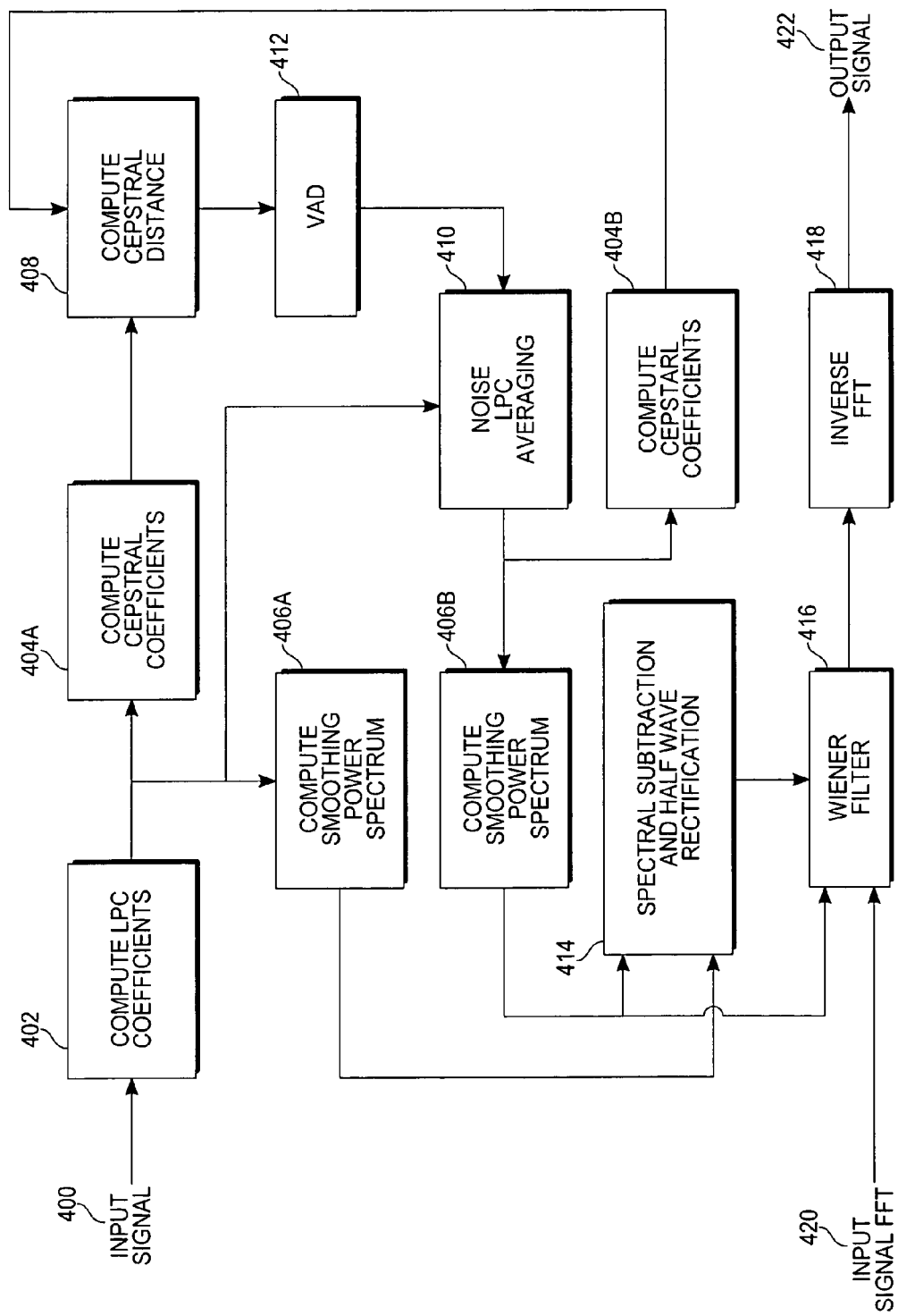
FIG. 4 illustrates a speech processing algorithm which can be beneficially processed by means of complex domain floating-point arithmetic.

FIG. 4 illustrates a flow diagram for a speech enhancement method constructed and operative in accordance with the exemplary embodiment of the present invention. The algorithms for carrying out the operations associated with the labeled elements are generally known to those skilled in the art. An input signal 400 is provided in time sampled format to a linear predictive coding (LPC) block 402 which computes the LPC coefficients. Briefly, LPC attempts to predict future values of the input signal based upon a linear combination of a finite number of previous samples. The LPC samples are passed to a first cepstral block 404A for computation of cepstral coefficients, to a first power spectrum block 406A for computation of the power spectrum, and to a noise averaging block 410 for LPC noise averaging. Turning first to the first cepstral block 404A, the LPC coefficients are employed to compute a set of cepstral coefficients. Cepstral coefficients represent the spectral components of a signal as an orthogonal vector set. The real cepstrum representation is especially useful for certain signal processing tasks such as echo detection and cancellation. One exemplary method of deriving the cepstral coefficients from the LPC coefficients is by means of the recursive algorithm:

$$c_i = a_i + \frac{1}{i} \sum_{j=1}^{i-1} (j) a_{i-j} c_j, i = 1, \ldots, n$$

where $c_i$ are the cepstral coefficient values, and $a_i$ represent the LPC coefficients. Another way to conceptualize the cepstral coefficients is to express them in the following representation:

cepstral coefficients=real(ifft(log(|fft(X)|)))

where X is an input data frame. Examination of this equation shows that the computation of the cepstral coefficient requires computation of the FFT and inverse FFT functions, both requiring manipulation of data in the complex domain. A compute distance block 408 computes a distance between the output of the first cepstral block 404A, the series of cepstral coefficients previously detailed, and a series of cepstral coefficients output from a second cepstral block 404B used to estimate the cepstral structure of the noise signal during the time intervals where the speech signal is not present. The usage of the cepstral representation in the first cepstral block 404A, the second cepstral block 404B and the compute distance block 408 facilitates the separation of the spectral structure of the noise from the spectral structure of the voice signal in order to enable construction of a Wiener filter block 416, to be described infra. In this context, the cepstral distance is defined as the square root of the sum of the squares of the difference between vector coordinates: since the square root operation does not affect the metric adopted to distinguish voiced or unvoiced signals, the operation is not explicitly executed. The terminology employed is conventionally understood by those skilled in the art.

The second cepstral block 404B also computes cepstral coefficients, in this case utilizing data from the noise averaging block 410. A detector block 412 implements a voice activity detector (VAD) by any of a plurality of algorithms known to those skilled in the art. The noise averaging block 410 computes an average value based on the supplied input signal from the LPC block 402 and the detector block 412. It is to be appreciated by those skilled in the art that the first and second cepstral blocks 404A and 404B may share both software and hardware resources in the system, or may represent completely separate functionalities. That is, if the numeric operations performed by the first and second cepstral blocks 404A and 404B can be temporally separated, for example, it becomes possible to share the same data memory, registers, instruction set, and other resources for their computation.

The first power spectrum block 406A and a second power spectrum block 406B each compute a smoothed estimate of the power spectrum in the sense that the auto recursive coefficients that represent the power spectrum estimate are time averaged (low pass filtered) with the previous estimates of the auto recursive coefficients using the following expression:

$$C_i = \alpha C_e + (1-\alpha) C_{i-1}$$

where $C_e$ represents the estimate of the auto recursive coefficients based on the current data frame, $C_{i-1}$ represents the previous averaged estimate, and $C_i$ represents the current averaged estimate.

The operations performed by the first and second power spectrum blocks 406A and 406B may share software and hardware resources or may represent completely different functionalities, for reasons completely analogous to those discussed in connection with the operation of the first and second cepstral blocks 404A and 404B. The outputs of the first and second power spectrum blocks 406A and 406B are provided to a spectral/half wave block 414 which performs a differencing operation between the spectra followed by half wave rectification in which any resulting negative spectral coefficient values are set equal to zero. The output of the spectral/half wave block 414 and the output of the second power spectrum block 406B are provided to the filter block 416 which operates on an FFT transformed input signal 420 to implement a Weiner filter function on the transformed input signal. The Wiener filter function is known in the art as a minimum mean-square estimator which employs a model of the system error or noise to mathematically minimize the average error in a desired signal due to noise degradation. The Wiener filter function operates in the frequency domain, hence an application of the input signal in the form of the FFT transformed input signal 420. One exemplary representation of a Wiener filter is given by the expression:

$$H(\omega) = \frac{R_s(\omega)}{R_s(\omega) + R_n(\omega)}$$

where $H(\omega)$ is the filter function, $R_s(\omega)$ is the power spectral density of the noise-free signal, and $R_n(\omega)$ is the power spectral density of the noise. The output of the filter block 416 is provided to an inverse FFT block 418 which computes an inverse FFT by any of a plurality of methods known in the art. The computation of the inverse FFT converts the filtered signal from the frequency domain to the time domain. The output from the inverse FFT block 418 is an output signal 422 which is a noise-reduced version of the input signal 400.

It will be appreciated by those skilled in the art that the method embodied in FIG. 4 is also potentially applicable to image enhancement, improvement of signal to noise ratio (SNR) in a general data stream, and other applications where digital signal processing is typically employed. It is to be further appreciated that the computations may beneficially utilize floating-point complex number representations for part or all of the numeric manipulations, and the manipulations may take advantage of the capabilities embodied in the present invention.

Figure 5:
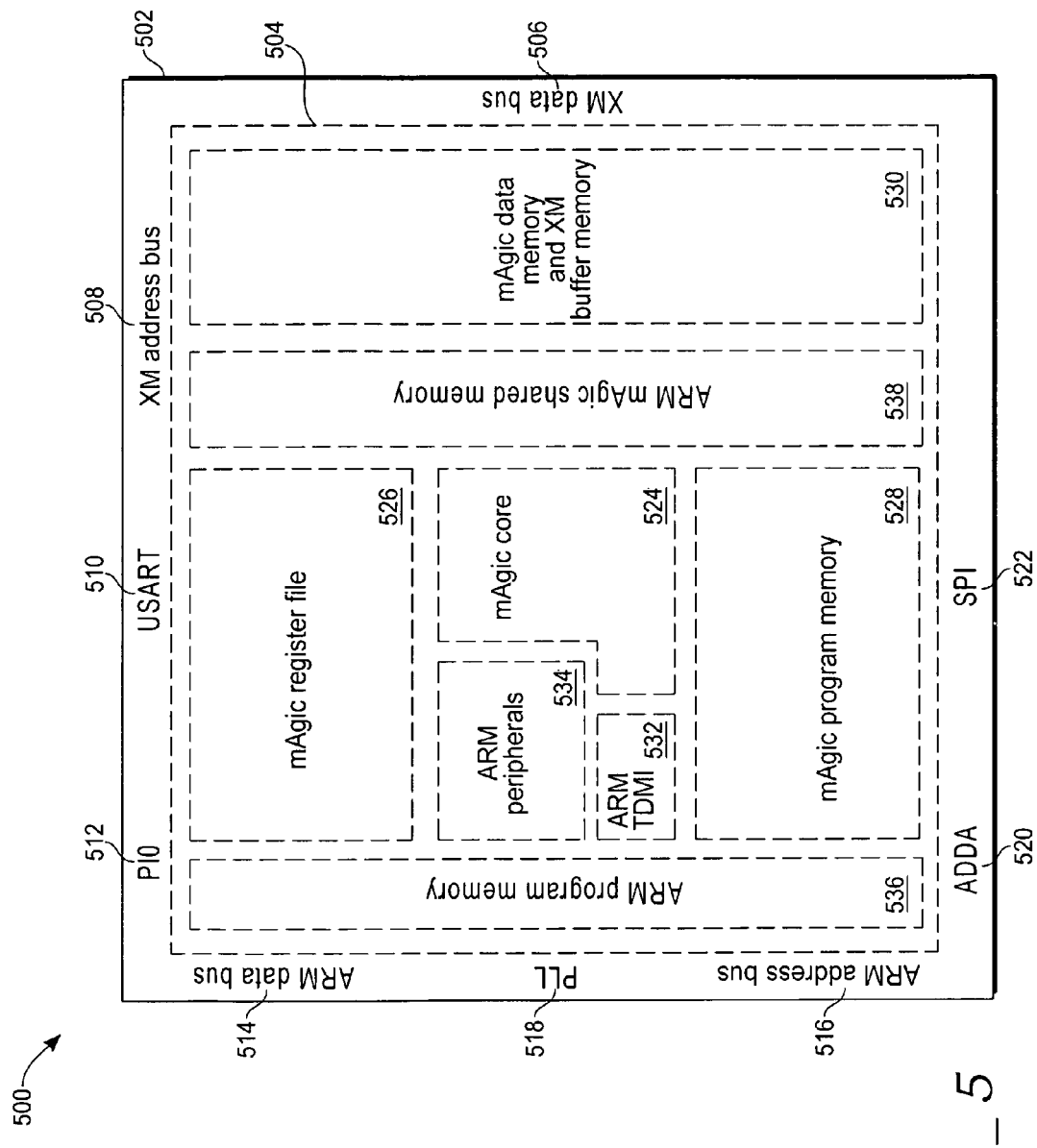
FIG. 5 illustrates a layout floorplan for an integrated circuit based upon the present invention.

With reference to FIG. 5, a layout floorplan is presented for the exemplary embodiment of the present invention. This layout illustrates an integrated circuit 500 which implements the architecture of the SoC 102, comprising the integration of an ARM7TDMI™ ARM Thumb processor core with an Atmel® mAgic high performance very long instruction word (VLIW) DSP utilizing a commercial 180 nm CMOS silicon process technology with five levels of metallization.

Integrated circuit 500 comprises an SoC pad ring 502 and SoC core circuits 504. The SoC pad ring 502 is comprised of external memory data bus access pads 506, an external memory address bus access pads 508, universal synchronous/asynchronous receiver/transmitter (USART) access pads 510, parallel I/O (PIO) access pads 512, ARM7 data bus pads 514, ARM7 address bus pads 516, PLL pads 518, analog to digital and digital to analog interface (ADDA) pads 520, and serial peripheral interface (SPI) pads 522. The SoC core circuits 504 is comprised of a mAgic core 524, a mAgic register file 526, a mAgic program memory 528, a mAgic data memory and XM buffer memory 530, an ARM7TDMI™ core 532, ARM7 peripherals 534, an ARM program memory 536, and Arm mAgic shared memory buffer 538.

With further reference to FIG. 5, mAgic core 524 is a physical implementation and exemplary embodiment of the architecture of the DSP core 108, the mAgic register file 526 is a physical implementation and exemplary embodiment of the data register file 204, the mAgic program memory 528 is a physical implementation and exemplary embodiment of the program memory 148, the mAgic data memory and XM buffer memory 530 is a physical implementation and exemplary embodiment of the data memory 150 and the data buffer 152, the ARM7TDMI™ core 532 is a physical implementation and exemplary embodiment of the microprocessor core 106, the ARM7 peripherals 534 are a physical implementation and exemplary embodiment of the peripheral circuits 110, the ARM program memory 536 is a physical implementation and exemplary embodiment of the microprocessor memory 128, and the Arm mAgic shared memory buffer 538 is a physical implementation and exemplary embodiment of the shared memory 146.

The approximate die size for the integrated circuit 500 excluding bond pad areas is 45 mm². It will be appreciated by those skilled in the art that other layout configurations are possible and that other process technologies may be employed to fabricate various embodiments of the present invention.

Figure 6:
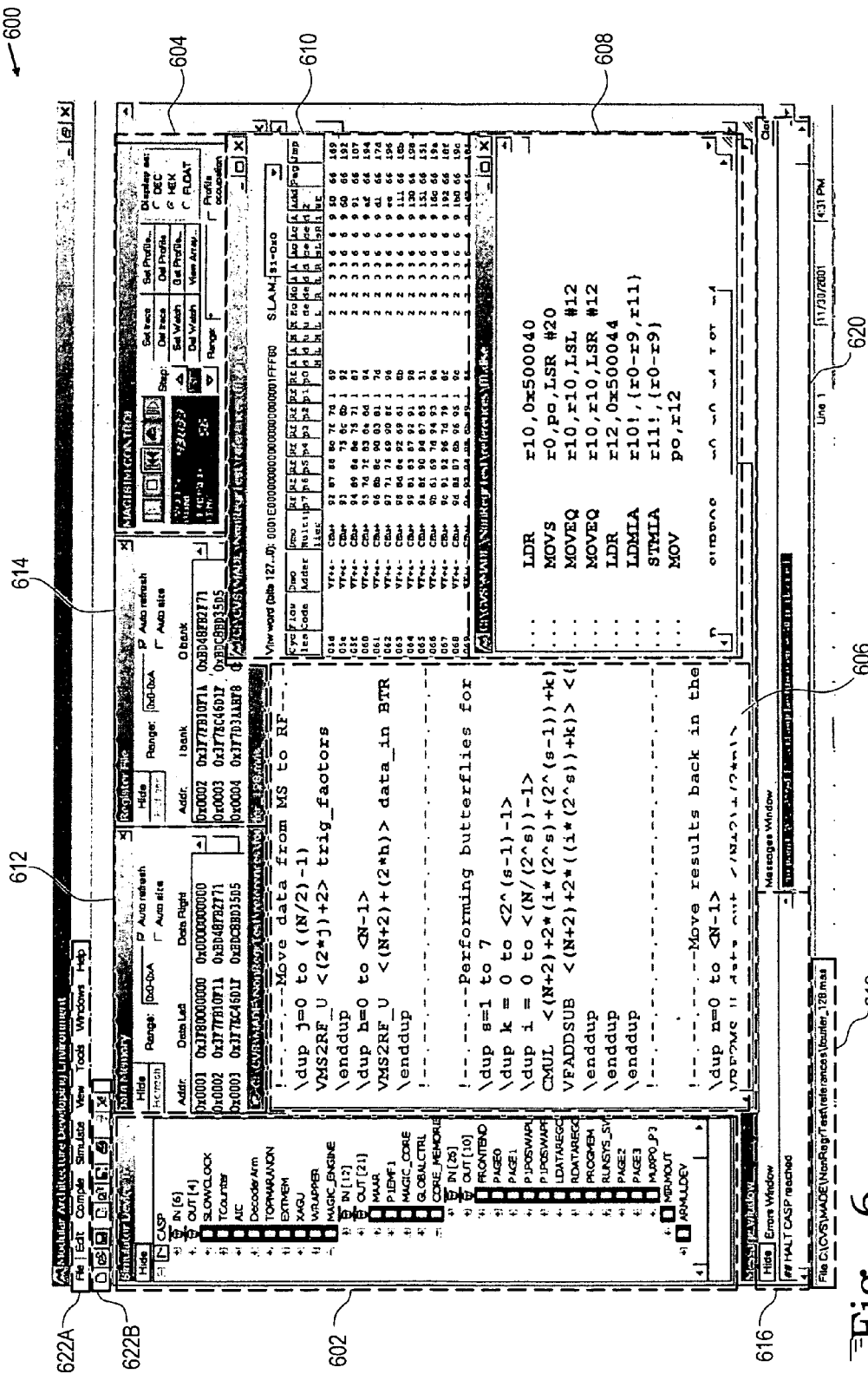
FIG. 6 illustrates, by way of example, a display depicting software development for digital signal processing and a microprocessor in a single development environment.

Attention is now directed to FIG. 6 which illustrates, by way of example, a display depicting software development for digital signal processing and microprocessor operation in a single development environment. A graphical user interface 600 provides a method of user interaction with the development environment, comprising a simulator device tree window 602, a simulation control window 604, a DSP code development interface 606, a microprocessor code development interface 608, a DSP program disassembly interface 610, a data memory interface 612, a register file interface 614, an error reporting window 616, a file reference window 618, a message window 620, a text toolbar 622A, and a graphical toolbar 622B.

The simulator device tree window 602 provides exploration and visual access to the internal resources of both the digital signal processing core 108 and the microprocessor core 106. The DSP code development interface 606 provides means for entering commands from the digital signal processor instruction set and means for compilation into object code and linking into executable code. The compilation mechanism enables the user to enter commands in a serial fashion, while creating optimized code scheduled to take advantage of the digital signal processor instruction level parallelism, including data dependencies and latencies. An example of a series of sequential code commands and the resulting optimized scheduled code is as follows:

| Sequential Code | Scheduled Code |
| --- | --- |
| A = B + C | A = B + C; D = E * F; Q = Memory[I] |
| D = E * F | L = M + N |
| G = A + D | G = A + D; P = Q * R |
| L = M + N | |
| Q = Memory[I} | |
| P = Q * R | | where scheduled code instructions appearing on the same line imply parallel execution within the DSP core 108.

The microprocessor code development interface 608, provides means for entering commands from the microprocessor instruction set and means for compilation into object code and linking into executable code. The DSP program disassembly interface 610 provides means for interrogating values contained in the local sequencer 210, the data register file 204, the multiple address generation unit 206, and the address register file 208. The address register file 208 is also referred to as SLAMP registers. The SLAMP registers comprise:

S: an 11-bit start register identifying the vector absolute base address or circular buffer starting address;

L: an 11-bit length register specifying vector length;

A: an 11-bit address register specifying the address offset or absolute base address;

M: a 7-bit increment register giving the address increment; and

P: a 9-bit page register providing page addresses for internal memory.

The SLAMP fields are used in varying combinations to control different modes of operation of the multiple address generation unit 206. The data memory interface 612 provides means for inspection of data values stored in the data memory 150. The register file interface 614 provides means for inspection of data values stored in the data register file 204. The simulation control window 604 provides means for invoking simulations whereby the user is able to select a cycle accurate simulation or an instruction accurate simulation. The error reporting window 616 provides means for communicating errors to the user. The file reference window 618 provides means for referencing the file being modified or otherwise utilized by the simulation environment. The message window 620 provides means for communication of relevant messages to the user. The text toolbar 622A provides text based reference and access to controls for the software development environment. The graphical toolbar 622B provides visual reference and access to commonly used controls for the software development environment. It will be appreciated by those skilled in the art that the interfaces and controls presented may be augmented by other windows providing additional information or functionality, and that the exact form and placement of the windows may be varied to suit the user's preference within the spirit of the present invention.

Figure 7:
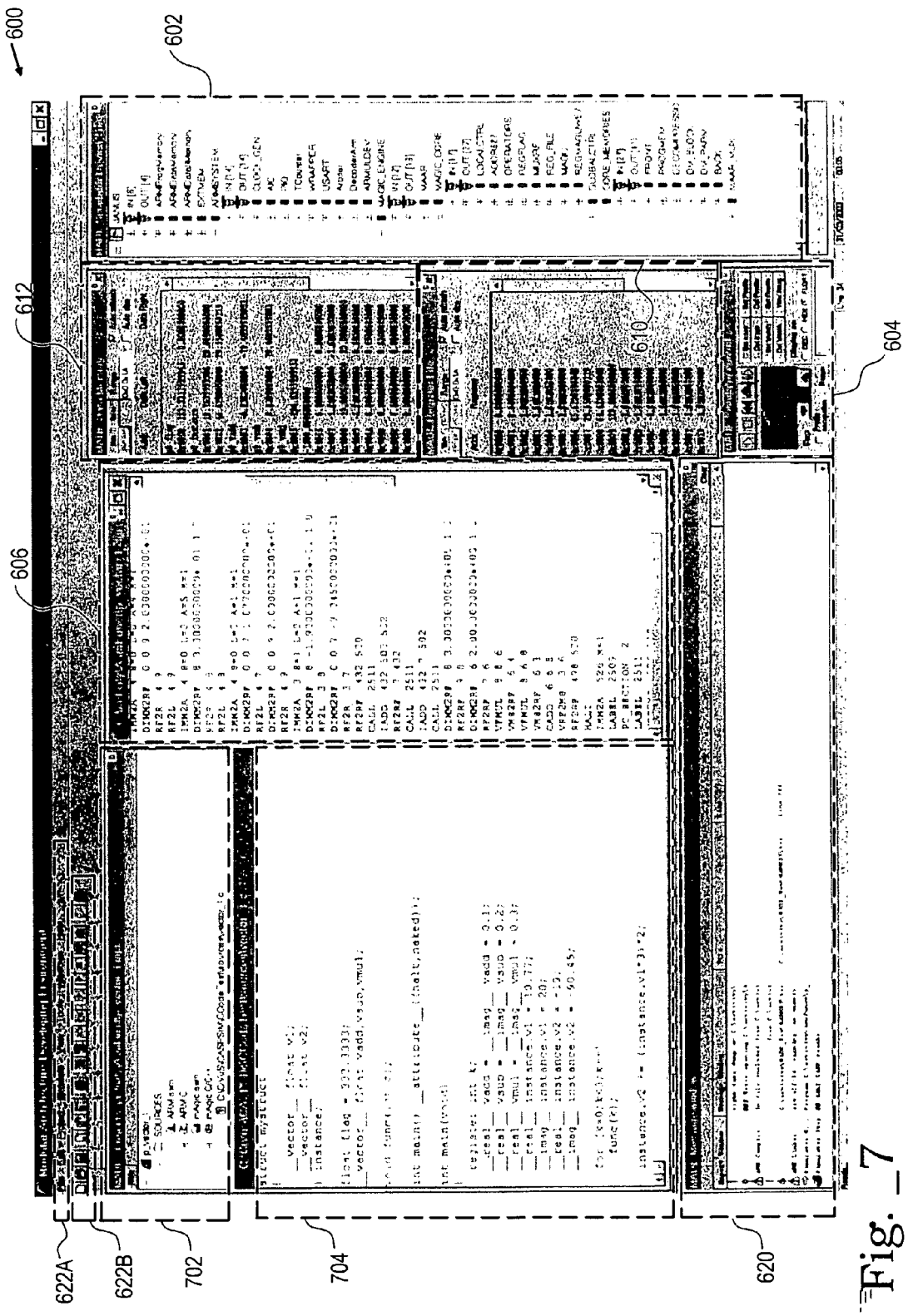
FIG. 7 shows a display depicting software development support with a C-language compiler for specialized data types and operations, with reference to an example regarding vector operations and operands.

With reference to FIG. 7 a display depicting software development support with a C-language compiler for specialized data types and operations is presented, with reference to an example regarding vector operations and operands. Those skilled in the art will appreciate that the depiction and descriptions infra can be applied with equal validity to a plurality of programming language selections. A source code tree 702 provides visual access to source code modules for C programs, C++ programs, and assembly language programs to be executed by the microprocessor core 106 and the DSP core 108. An extended code development interface 704 provides means for entering commands based on the C programming language, the C++ programming language, or assembly language for the intended processor. The extended code development interface 704 further provides means for compilation of said commands into object code, and linking of the object code into executable code. It will be appreciated by those skilled in the art that the C programming language is substantially a subset of the C++ programming language. Furthermore, a number of standards exist for the C programming language and the C++ programming language. In the context of this specification, it is to be understood that the terms C programming language, C++ programming language, C, C++, and C/C++ are not intended to be limiting and are interchangeable for the purpose of this specification. Said terms are intended to be consistent with versions of the language in wide acceptance. A specific version of the C++ language consistent with this interpretation is given by the specification ISO/IEC 14882:1998. Source code written in a format consistent with this specification will be referred to as International Organization for Standardization (ISO) C compliant.

The extended code development interface 704 further provides means for translation and compilation of C++ callable digital signal processing functions, and is provided with means for operating on a set of extended data types comprising int, float, _complex_int, _complex_float, vector int, vector float, pointers, arrays, structures, and unions. The extended code development interface is also capable of interfacing with the American National Standards Institute (ANSI) C standard math library, which is known by those skilled in the art as a subset of the ISO/IEC 9899:1990 specification for the standard C library. The extended code development interface 704 also incorporates compiler means with language extensions to implement IF statement translation with entire condition expression evaluation, language extensions to implement WHERE statement translation, and optimization of register usage.

In the foregoing specification, the present invention has been described with reference to specific embodiments thereof. It will, however, be evident that various modifications and changes can be made thereto without departing from the broader spirit and scope of the present invention as set forth in the appended claims. The specification and drawings are, accordingly, to be regarded in an illustrative rather than a restrictive sense.

What is claimed is:

1. A single chip architecture for a digital signal processor (DSP) capable of performing operations on floating-point data in a complex domain, said single chip architecture comprising:
a program memory coupled to a local sequencer having an instruction decoder, a condition generator, a status register, and a program counter, said program memory further coupled to a data/program bus multiplexer;
a very large instruction word (VLIW) DSP core coupled to said program memory, and to said local sequencer, said VLIW DSP core having a multiple address generation unit coupled to an address register file and a data register file, said data register file coupled to said multiple address generation unit, to said address register file, and to an operator block, said operator block coupled to said address register file, and to said multiple address generation unit, said operator block having a first operator block portion and a second operator block portion coupled to each other, each of said first and said second operator block portions having a first and a second floating point/integer multiplier, a floating point/integer complex adder, and a floating point/integer adder, said first and said second floating point/integer multipliers coupled to said floating point/integer complex adder, said floating point/integer adder coupled to said complex adder and to said data register file, said floating point/integer complex adder having a first adder portion and a second adder portion;
a direct memory access (DMA) controller coupled to said local sequencer and said data/program bus multiplexer;
a microprocessor interface coupled to a shared memory, said shared memory further coupled to a data memory; and
a data buffer coupled to said data/program bus multiplexer, to said data memory, to said VLIW DSP core, and to said shared memory, wherein said single chip architecture is formed on a single integrated circuit chip.

2. The architecture of claim 1, wherein said data register file is comprised of a first data register portion and a second data register portion.

3. The architecture of claim 2, wherein said first and second data register portions comprise respectively a real data portion and an imaginary data portion.

4. The architecture of claim 1, wherein said shared memory is comprised of a first shared memory bank and a second shared memory bank, said first and second shared memory banks each organized as a dual port memory.

5. The architecture of claim 1, wherein said data memory is comprised of a first data memory bank and a second data memory bank, said first and second data memory banks each organized as a dual port memory.

6. The architecture of claim 1, wherein said data buffer is comprised of a first data buffer portion and a second data buffer portion, said first and second data buffer portions each organized as a dual port memory.

7. A single chip architecture for a digital signal processor (DSP) capable of performing operations on floating-point data in a complex domain, said single chip architecture comprising:
a program memory coupled to a local sequencer having an instruction decoder, a condition generator, a status register, and a program counter, said program memory further coupled to a data/program bus multiplexer;
a very large instruction word (VLIW) DSP core coupled to said program memory, and to said local sequencer, said VLIW DSP core having a multiple address generation unit coupled to an address register file and a data register file, said data register file coupled to said multiple address generation unit, to said address register file, and to an operator block, said operator block coupled to said address register file, and to said multiple address generation unit, said operator block having a first operator block portion and a second operator block portion coupled to each other, each of said first and said second operator block portions having a first and a second floating point/integer multiplier, a floating point/integer complex adder, and a floating point/integer adder, said first and said second floating point/integer multipliers coupled to said floating point/integer complex adder, said floating point/integer adder coupled to said complex adder and to said data register file, said floating point/integer complex adder having a first adder portion and a second adder portion;
a microprocessor interface coupled to a shared memory, said shared memory further coupled to a data memory;

a data buffer coupled to said data/program bus multiplexer, to said data memory, to said VLIW DSP core, and to said shared memory, wherein said single chip architecture is formed on a single integrated circuit chip;

wherein said data register file is comprised of a first data register portion and a second data register portion; and wherein said first and second data register portions comprise respectively a real data portion and an imaginary data portion.

8. The architecture of claim 7 including a direct memory access (DMA) controller coupled to said local sequencer and said data/program bus multiplexer.

9. The architecture of claim 7, wherein said shared memory is comprised of a first shared memory bank and a second shared memory bank, said first and second shared memory banks each organized as a dual port memory.

10. The architecture of claim 7, wherein said data memory is comprised of a first data memory bank and a second data memory bank, said first and second data memory banks each organized as a dual port memory.

11. The architecture of claim 7, wherein said data buffer is comprised of a first data buffer portion and a second data buffer portion, said first and second data buffer portions each organized as a dual port memory.

* * * * *